(12) United States Patent
Davis

(10) Patent No.: US 8,590,976 B2
(45) Date of Patent: Nov. 26, 2013

(54) KNOCK DOWN FURNITURE WITH LOCKING JOINTS

(76) Inventor: Clark Davis, Genola, UT (US)

( * ) Notice: Subject to any disclaimer, the term of this patent is extended or adjusted under 35 U.S.C. 154(b) by 133 days.

(21) Appl. No.: 13/248,236

(22) Filed: Sep. 29, 2011

(65) Prior Publication Data

US 2012/0080910 A1    Apr. 5, 2012

Related U.S. Application Data

(60) Provisional application No. 61/388,663, filed on Oct. 1, 2010, provisional application No. 61/434,213, filed on Jan. 19, 2011.

(51) Int. Cl.
*A47C 7/02* (2006.01)

(52) U.S. Cl.
USPC ............... 297/440.13; 297/440.1; 297/440.14

(58) Field of Classification Search
USPC ............... 297/440.13, 440.1, 440.11, 440.12, 297/440.14
See application file for complete search history.

(56) References Cited

U.S. PATENT DOCUMENTS

| | | | |
|---|---|---|---|
| 919,257 A | 4/1909 | Seydewitz |
| 1,061,297 A | 5/1913 | Johnson |
| 1,419,647 A | 6/1922 | Shepherdson |
| 1,903,631 A | 4/1933 | Morrison |
| 1,940,117 A | 12/1933 | Carpos |
| 2,334,912 A | 11/1943 | Eide |
| 2,369,930 A | 2/1945 | Wagner |
| D144,730 S | 5/1946 | Perrault |
| 2,418,731 A | 4/1947 | Seitz |
| 2,479,086 A | 8/1949 | Silverman |
| 2,481,671 A | 9/1949 | John et al. |
| 2,486,987 A | 11/1949 | Scarlett |
| 2,518,955 A | 8/1950 | Stelzer |
| 2,534,413 A | 12/1950 | Cenis |
| 2,551,071 A | 5/1951 | Tyncs |
| D164,552 S | 9/1951 | Curtis |
| 2,595,002 A | 4/1952 | Schneider |
| 2,615,771 A | 10/1952 | Curtis |
| 2,632,498 A | 3/1953 | Curtis |
| 2,672,181 A | 3/1954 | Rose |
| 2,720,253 A | 10/1955 | Turner |
| 2,792,877 A | 5/1957 | West |

(Continued)

FOREIGN PATENT DOCUMENTS

WO    WO 2005-085656    9/2005

OTHER PUBLICATIONS

Celery Rocking Chair viewed at http://www.eroomservice.com/manufacturer/celery/ circa Dec. 3, 2011.

(Continued)

*Primary Examiner* — Rodney B White
(74) *Attorney, Agent, or Firm* — Brett Peterson; Pate Peterson PLLC

(57) ABSTRACT

A knock down furniture system is presented. The furniture uses joints which bend or twist a panel when inserted into an adjoining panel to place the joint under stress and stiffen the joint. Preferably, tabs are used in combination with offset or rotated slots to achieve the same. The system allows for furniture which does not require fasteners or tools and which is easily assembled while still being stable. Parts of the furniture can be interchanged within a piece of furniture or between different pieces of furniture to customize the configuration of the furniture.

17 Claims, 20 Drawing Sheets

(56) References Cited

U.S. PATENT DOCUMENTS

| | | | |
|---|---|---|---|
| 2,825,101 A | 3/1958 | Rubsnstein | |
| 3,149,880 A | 9/1964 | Steuer | |
| 3,262,405 A | 7/1966 | Sutton | |
| D212,601 S | 11/1968 | Rubenstein | |
| 3,527,497 A | 9/1970 | Self | |
| 3,547,491 A | 12/1970 | Bovasso | |
| 3,578,385 A | 5/1971 | Stiglitz | |
| 3,603,656 A | 9/1971 | Ferman | |
| 3,788,700 A | 1/1974 | Wartes | |
| 3,812,977 A | 5/1974 | Glassman | |
| 3,847,435 A | 11/1974 | Skinner | |
| 4,055,924 A * | 11/1977 | Beaver, Jr. | 297/440.13 X |
| D247,596 S | 3/1978 | Hashimoto | |
| 4,082,356 A | 4/1978 | Johnson | |
| 4,140,065 A | 2/1979 | Chacon | |
| 4,153,311 A | 5/1979 | Takhasaki | |
| 4,188,067 A | 2/1980 | Elmer | |
| 4,191,113 A | 3/1980 | Hogberg | |
| 4,202,581 A | 5/1980 | Fleishman | |
| 4,225,180 A | 9/1980 | Gillis | |
| 4,348,052 A | 9/1982 | Roland | |
| 4,390,204 A | 6/1983 | Fleishman | |
| 4,419,028 A | 12/1983 | Roland | |
| 4,433,753 A * | 2/1984 | Watson | 297/440.13 X |
| 4,433,843 A | 2/1984 | Bricco | |
| 4,509,794 A | 4/1985 | Roland | |
| 4,533,174 A | 8/1985 | Fleishman | |
| 4,574,917 A | 3/1986 | Stoddard | |
| 4,593,950 A | 6/1986 | Infanti | |
| D289,234 S | 4/1987 | Hoult | |
| 4,712,837 A | 12/1987 | Swilley | |
| D299,087 S | 12/1988 | Bruce | |
| D302,216 S | 7/1989 | Roland | |
| 4,846,530 A | 7/1989 | Noble | |
| 4,867,327 A | 9/1989 | Roland | |
| 4,926,759 A | 5/1990 | Vitsky et al. | |
| 5,011,228 A | 4/1991 | Marcantel | |
| 5,082,329 A | 1/1992 | Mars | |
| 5,263,766 A | 11/1993 | McCullough | |
| 5,275,467 A | 1/1994 | Kawecki | |
| 5,367,964 A | 11/1994 | Hockensmith | |
| 5,387,027 A | 2/1995 | Maloney | |
| 5,454,331 A * | 10/1995 | Green | 297/440.13 X |
| 5,605,378 A | 2/1997 | Oyediran | |
| 5,644,995 A | 7/1997 | Gurwell et al. | |
| 5,655,812 A * | 8/1997 | Albecker, III | 297/440.11 X |
| 5,765,922 A | 6/1998 | Hsia | |
| 5,803,548 A | 9/1998 | Battle | |
| 5,921,631 A | 7/1999 | Bush | |
| 5,927,816 A | 7/1999 | Hsu | |
| 5,992,938 A | 11/1999 | Jones | |
| 6,036,270 A | 3/2000 | Bufalini | |
| D422,799 S | 4/2000 | Dworshak et al. | |
| 6,109,695 A | 8/2000 | Kahwaji | |
| 6,155,641 A * | 12/2000 | Frost | 297/440.13 X |
| 6,174,116 B1 | 1/2001 | Brand | |
| 6,189,974 B1 | 2/2001 | Beck | |
| 6,247,754 B1 | 6/2001 | Vanderaue et al. | |
| 6,283,564 B1 | 9/2001 | Corson | |
| 6,378,707 B1 | 4/2002 | Taggert | |
| 6,443,076 B1 | 9/2002 | Case | |
| 6,532,878 B2 | 3/2003 | Tidemann | |
| 6,615,746 B2 | 9/2003 | Bart | |
| 6,615,999 B1 | 9/2003 | Culp | |
| 6,619,749 B2 | 9/2003 | Willy | |
| 6,675,979 B2 | 1/2004 | Taylor | |
| 6,769,369 B1 | 8/2004 | Brandenberg | |
| 6,807,912 B2 | 10/2004 | Willy | |
| D499,577 S | 12/2004 | Willy | |
| 6,845,871 B1 | 1/2005 | Culp | |
| 6,848,747 B1 | 2/2005 | Robinson | |
| 6,955,401 B1 | 10/2005 | Shoulberg | |
| 7,066,548 B2 * | 6/2006 | Butler | 297/440.13 X |
| 7,114,300 B1 | 10/2006 | Culp | |
| 7,168,766 B2 | 1/2007 | Pelletier | |
| 7,219,962 B2 | 5/2007 | Stone | |
| D547,076 S | 7/2007 | Hughes et al. | |
| 7,255,403 B2 * | 8/2007 | Butler | 297/440.13 X |
| 7,300,110 B1 | 11/2007 | Debien | |
| 7,533,940 B1 | 5/2009 | Zook | |
| 7,631,605 B2 | 12/2009 | Willy | |
| 7,856,772 B1 | 12/2010 | Culp et al. | |
| 8,167,377 B2 * | 5/2012 | Kovach | 297/440.13 |
| 2003/0107255 A1 | 6/2003 | Willy | |
| 2004/0056526 A1 | 3/2004 | Willy | |
| 2009/0066140 A1 | 3/2009 | Berent et al. | |
| 2010/0003077 A1 | 1/2010 | Kelley | |

OTHER PUBLICATIONS

PlyGrid Shelves viewed at http://offi.com/products/offikids/PLYGRID.php?p2c=249 circa Dec. 3, 2011.

Snap Table viewed at http://www.offi.com/pdfs/snaptable.pdf circa Dec. 3, 2011.

Furniture viewed at http://www.playatech.com/product_list.php circa Dec. 3, 2011.

Arabic Table viewed at http://www.plydea.com/support/assemblypdf.html circa Dec. 3, 2011.

Blue7Chair viewed at http://www.plydea.com/support/assemblypdf.html circa Dec. 3, 2011.

First Desk viewed at http://www.plydea.com/support/assemblypdf.html circa Dec. 3, 2011.

Rinaldo Chair viewed at http://www.plydea.com/support/assemblypdf.html circa Dec. 3, 2011.

Tuffet Stool viewed at http://www.plydea.com/support/assemblypdf.html circa Dec. 3, 2011.

WasteNot Basket viewed at http://www.plydea.com/support/assemblypdf.html circa Dec. 3, 2011.

Winehold Wine Rack viewed at http://www.plydea.com/support/assemblypdf.html circa Dec. 3, 2011.

International Search Report and Written Opinion of the International Searching Authority for PCT Application No. US2011/054217, Apr. 24, 2012.

* cited by examiner

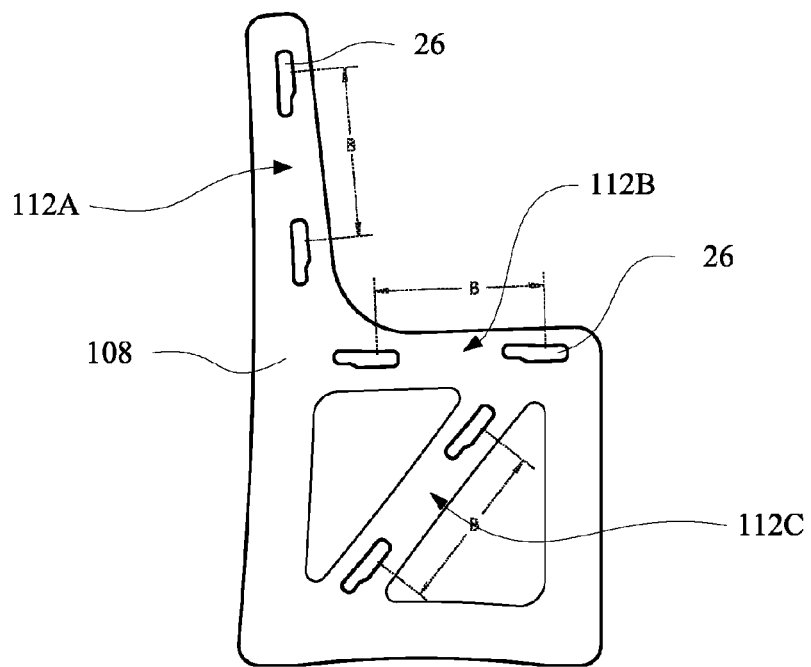
FIG. 21
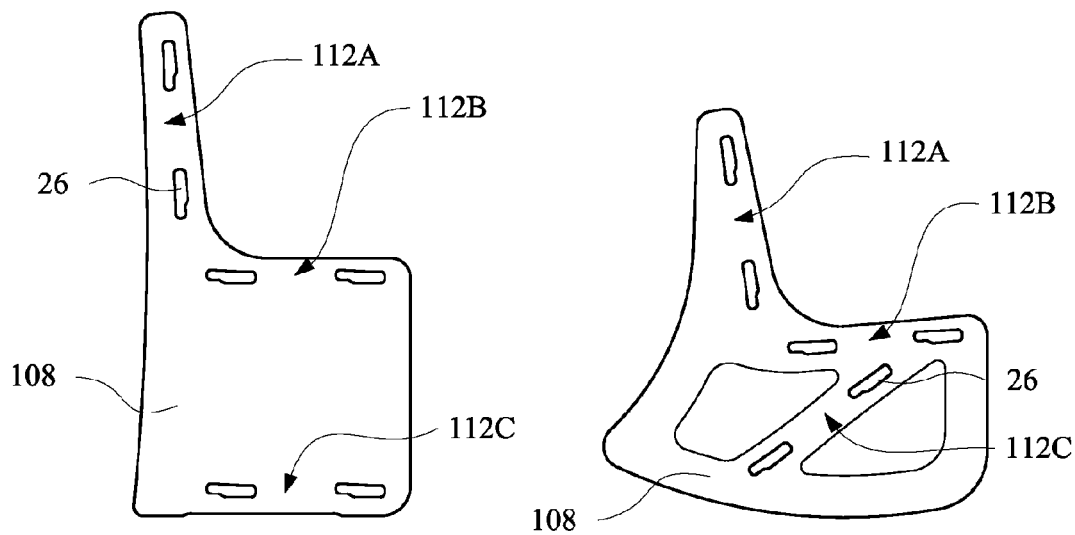
FIG. 22
FIG. 23

KNOCK DOWN FURNITURE WITH LOCKING JOINTS

PRIORITY

The present application claims the benefit of U.S. Provisional Application Ser. No. 61/388,663, filed Oct. 1, 2010 which is incorporated herein by reference in its entirety, and also claims the benefit of U.S. Provisional Application Ser. No. 61/434,213, filed Jan. 19, 2011 which is herein incorporated by reference in its entirety.

THE FIELD OF THE INVENTION

The present invention relates to modular furniture. More specifically, the present invention relates to modular furniture which is assembled largely from flat pieces without tools and without connection hardware.

BACKGROUND

Ready to assemble or knock-down type furniture is often used where a person desires furniture which is easy to assemble or which is easy to transport or store when disassembled. This style of furniture is often used by college students, for example, as it can be easily moved and stored. Typical ready to assemble furniture, however, has its disadvantages. A significant disadvantage is that the furniture requires hardware and tools for assembly. This furniture typically uses metal posts and cams to assemble the furniture. The metal posts screw into and extend from particle board panels and are inserted into a cam lock in another panel. The cam lock is rotated to hold the post captive. Other ready to assemble furniture uses a few small nails to assemble the furniture.

These available furniture systems have several disadvantages. The fasteners are difficult to adequately tighten and, even when properly tightened, are simply insufficient to secure the furniture. As such, the assembled furniture is not particularly sturdy and the shifting of the furniture panels as the furniture is moved or used places significant stress on the fasteners. This movement loosens the fasteners and destroys the wood around the fastener, degrading the quality of the furniture.

Available furniture is also disadvantageous as it requires tools to assemble or disassemble. Many people have few tools and may not have the proper tools for assembly. This makes proper assembly more difficult. Additionally, available knock down furniture is often complex to assemble. Combined with typically poor instructions, most persons do not enjoy assembling the furniture.

SUMMARY OF THE INVENTION

It is an object of the present invention to provide an improved knock down or ready to assemble furniture.

Furniture is provided where the joint members formed in each piece of the furniture both lock the furniture together and stabilize the furniture without the use of additional fasteners. Furniture may be assembled with only tabs and slots while remaining stable and strong. The furniture may be formed so that all furniture pieces are flat, simplifying manufacture of the furniture and making the furniture more compact when disassembled for storage or transportation. Additionally, furniture is provided where pieces of the furniture can be interchanged within a single piece of furniture and can be interchanged between different pieces of furniture to ease assembly and to create different furniture pieces. The present invention is advantageous as it does not require pegs or other items projecting out of the plane of a furniture member, and does not require complex sequencing for stability as other pieces of furniture do.

These and other aspects of the present invention are realized in furniture as shown and described in the following figures and related description.

BRIEF DESCRIPTION OF THE DRAWINGS

Various embodiments of the present invention are shown and described in reference to the numbered drawings wherein:

FIG. 21 shows a furniture panel of the present invention;
FIG. 22 shows a furniture panel of the present invention;
FIG. 23 shows a furniture panel of the present invention.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single FIGURE, and as such, multiple

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
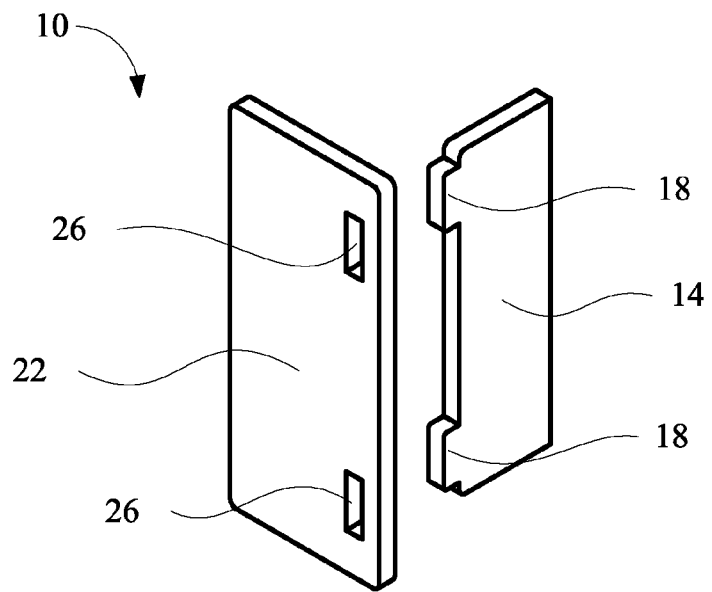
FIG. 1 shows a perspective view of a furniture joint of the present invention.
Figure 2:
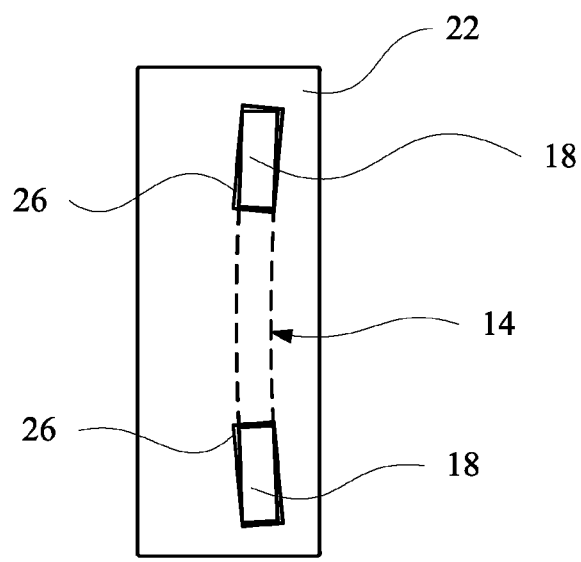
FIG. 2 shows an end view of the joint of FIG. 1.

Turning now to FIG. 1, a perspective view of a basic joint 10 according to the present invention is shown. The joint includes a first furniture panel 14 which has tabs 18 extending therefrom and a second furniture panel 22 which has slots 26 formed therein. FIG. 2 shows an end view of the assembled joint. The tabs 18 have been placed into the slots 26. As is seen, the slots 26 are rotated slightly so that the panel 14 must be bent or bowed slightly in order to place the tabs 18 into the slots 26. This creates some friction and some interference between the tabs 18 and slots 26 and stabilizes the joint. The joint is held in place by the friction.

Figure 3:
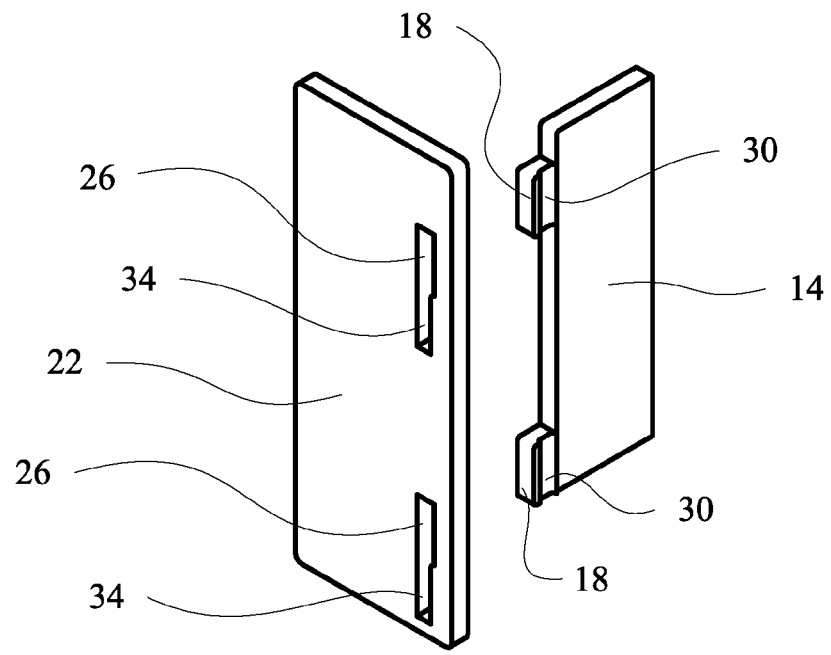
FIG. 3 shows a perspective view of a furniture joint of the present invention.
Figure 4:
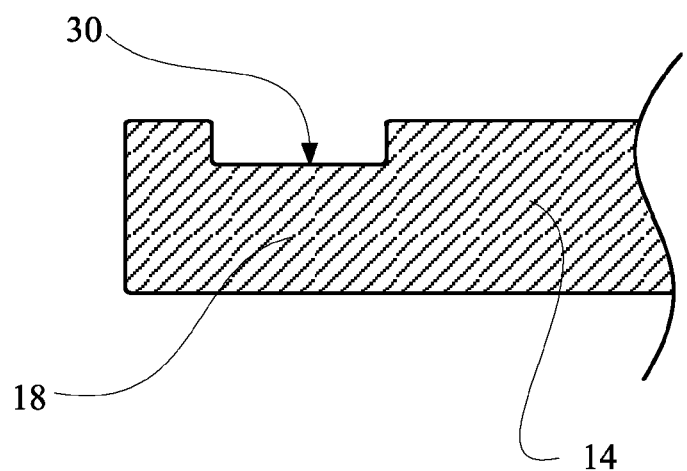
FIG. 4 shows an end view of the tab of FIG. 3.
Figure 5:
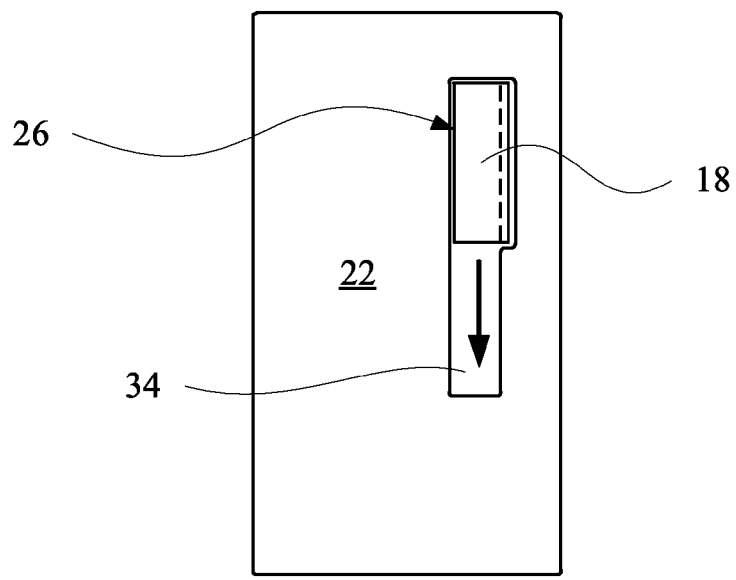
FIG. 5 shows an end view of the joint of FIG. 3.
Figure 6:
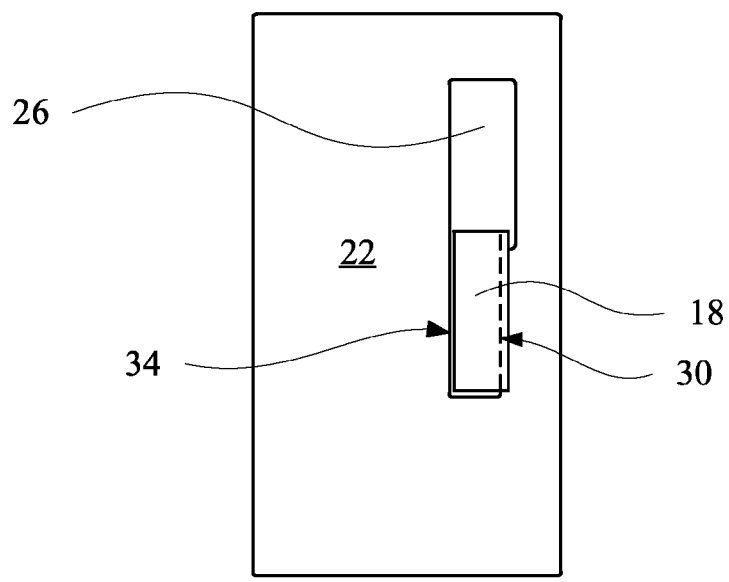
FIG. 6 shows an end view of the joint of FIG. 3.

FIG. 3 shows an alternative joint configuration wherein the tabs 18 have a recess 30 cut in the face of the tab, adjacent the panel 14. FIG. 4 shows a cross section of the tab 18. Additionally, the slot 26 is longer, having a narrowed portion 34 at the bottom of the slot. The wider top portion of the slot 26 is sufficiently wide to accept the end of the tab 18 while the narrowed bottom portion 34 of the slot is narrowed and will accept the recessed portion 30 of the tab. FIGS. 5 and 6 shows the tab 18 inserted into the slot and then slid into the narrowed portion of the slot 34 (FIG. 6). This position keeps the tab 18 from pulling straight out of the slot 26 without first sliding upwardly.

Figure 7:
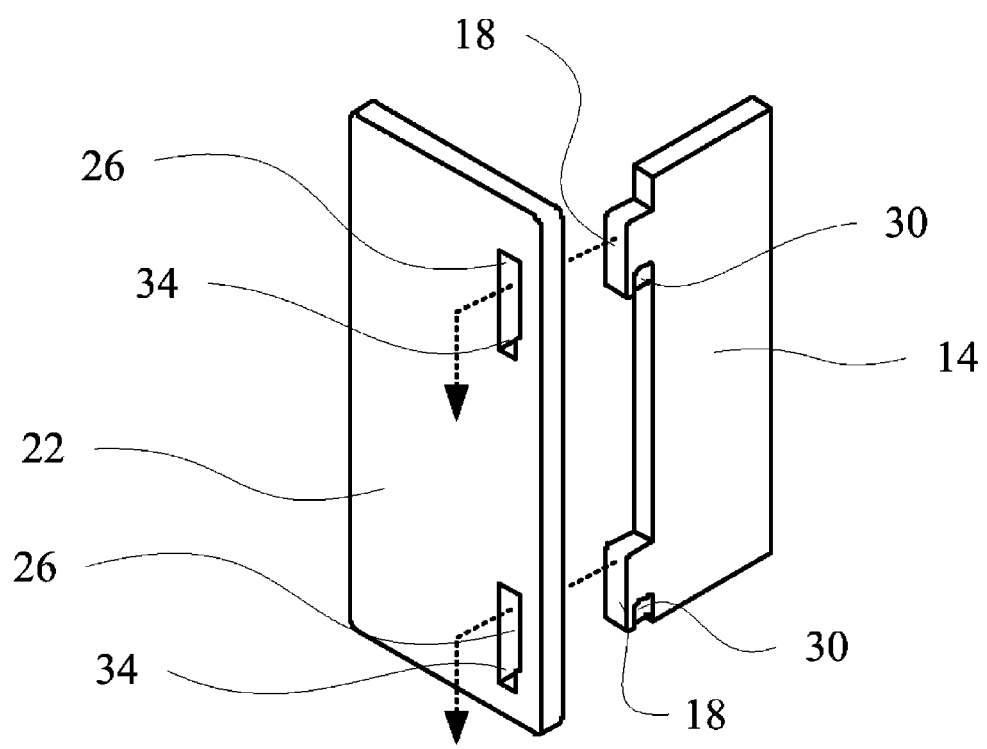
FIG. 7 shows a perspective view of a furniture joint of the present invention.
Figure 8:
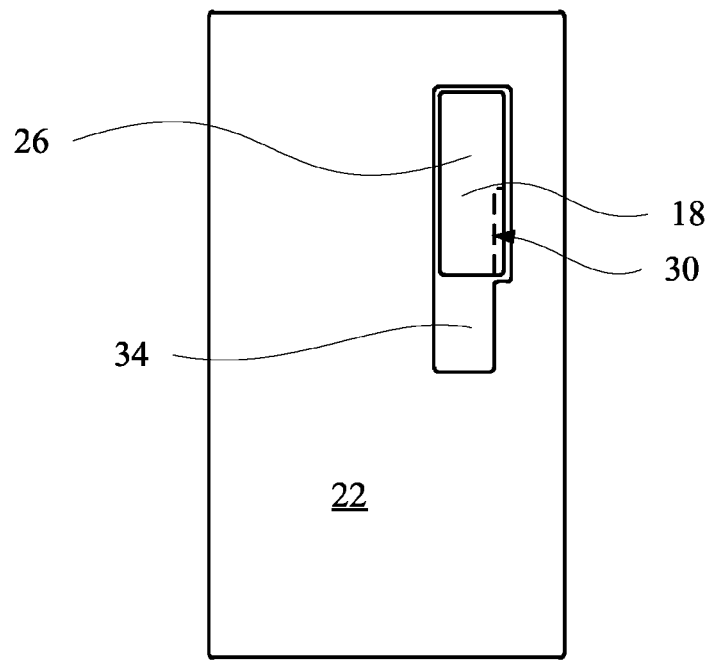
FIG. 8 shows an end view of the joint of FIG. 7.
Figure 9:
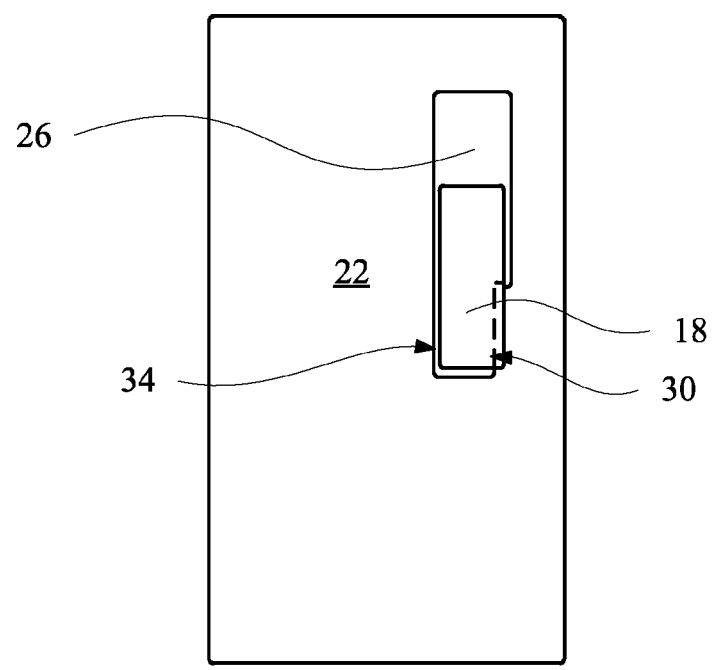
FIG. 9 shows an end view of the joint of FIG. 7.

FIGS. 7 through 9 show another joint configuration where the tab 18 has a partial recess 30 formed with the cross section shown in FIG. 4. Again, the slot 26 has a narrowed lower portion 34 which is too narrow to accept the full width of the tab 18 but will accept the recessed portion 30. FIGS. 8 and 9 show the tab 18 being inserted into the slot 26 transversely and slid lengthwise along the slot 26 such that the recessed portion of the tab 30 is disposed in the narrowed portion 34 of the slot.

Typically, the slots 26 are angled as shown above. When the tab 81 is installed into the slot 26, the panel 14 is bent slightly to cause friction and stabilize the joint. The slots 26 shown in FIGS. 3 through 9 may be formed such that the wide portion of the slot 26 is sufficiently wide to not bend the panel 14 when inserting the tabs 18 into the wider portion of the slot 26. The narrowed portion 34 of the slot 26 is sufficiently narrowed and oriented such that the panel 14 is bent when the tab 18 is slid into the narrowed portion 34. This makes the joint easy to assemble.

The tab and slot joints above are utilized with slots 26 which are angled to cause the panel 14 to bend as the tabs are inserted as is shown in FIG. 2. As discussed, the panel 14 must bend to change the angle of the tabs 18 in order to seat the tabs 18 fully in the slots 26. This bending causes a slight interference fit and friction, stabilizing the joint and holding the tabs 18 more securely in the slots 26.

FIG. 2 shows first order bending of the panel 14; bending the panel 14 into a single curve. In order to achieve this type of bend, the upper slot 26 is rotated in a clockwise direction and the lower slot 26 is rotated in a counterclockwise direction. This causes the upper tab 18 to be twisted in a clockwise direction and the lower tab 18 to be twisted in a counterclockwise direction to bend the panel 14 as shown.

Figure 10:
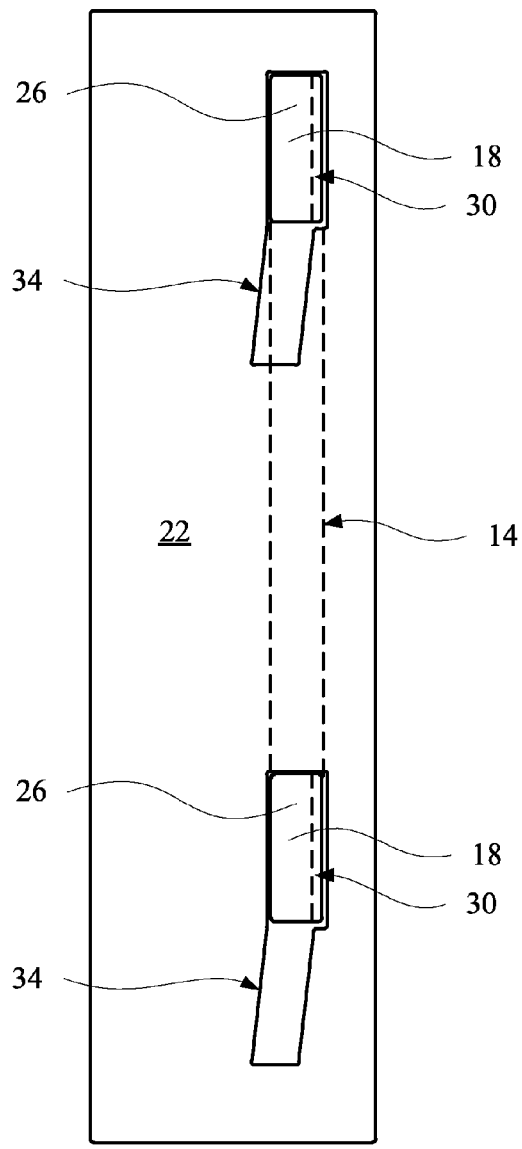
FIG. 10 shows an end view of a furniture joint of the present invention.
Figure 11:
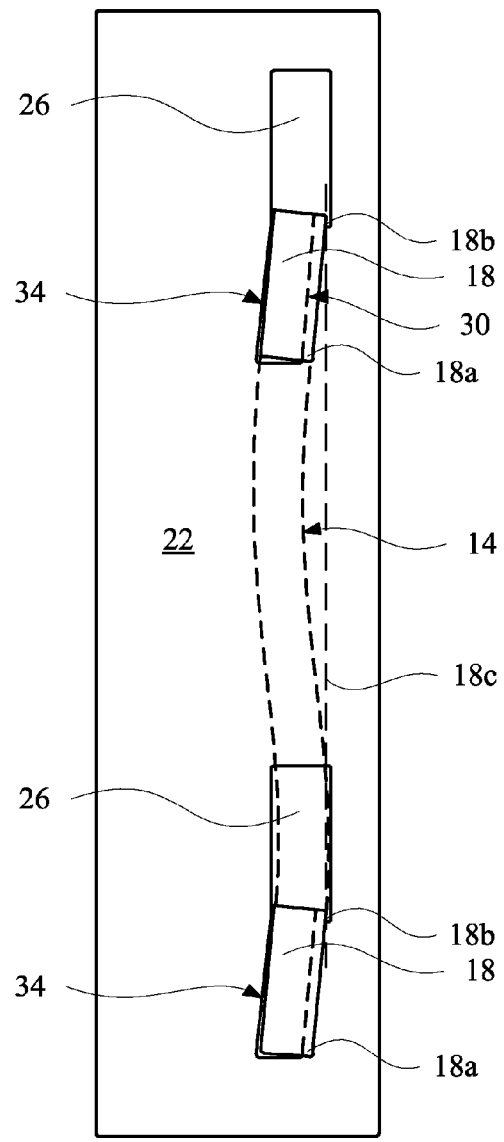
FIG. 11 shows an end view of the furniture joint of FIG. 10.

FIGS. 10 and 11 show a configuration where the panel 14 is bent into second order type of bend; the panel 14 being bent into an 'S' curve. This is accomplished by using slots 26 which are both rotated in the same (clockwise or counterclockwise) direction relative to the center line of the panel 14. FIG. 10 shows the tabs 18 inserted into the larger openings of a slot 26 and FIG. 11 shows the tabs 18 inserted into the narrowed portion 34 of the slots 26. It will be appreciated that both first order or second order bending can be used with plain tabs 18 as well as tabs with full or partial recesses 30.

The amount that a slot 26 is rotated away from the plane in which the panel 14 is placed depends on several factors. The type and thickness of the material and the number and placement of the tabs/slots primarily determine how much bending of the panel 14 is necessary to achieve a desired amount of stiffness in the resulting joint 10. For example, plywood is stiffer than MDF and requires less bending. Thicker materials require less bending than a similar thinner material. More closely spaced tabs 18 require less bending than tabs which are spaced farther apart. Second order bending of the panel 14 as shown in FIG. 11 makes a stiffer joint that first order bending as shown in FIG. 2. As such, less rotation of the slot 26 is necessary for a joint which utilizes second order bending.

Additionally, the use of the furniture is considered when determining how much the slots 26 twist the tabs 18 from horizontal. A child's chair will typically have less stiff joints as it does not support as much weight and as it may be desirable for the child to be able to assemble the chair. For furniture pieces which are made of MDF or plywood which is about 0.5 inches thick and having tabs approximately 1.5 inches wide and spaced about 12 inches apart, it works well to rotate the slot 26 to cause the tab to twist between 0.005 inches and 0.05 inches. Thus, in an assembled joint 10 the tabs 18 are twisted such that one side of the tab 18a is displaced laterally between 0.005 and 0.05 inches relative to the other side of the tab 18b as viewed in reference to the mean position of the panel 14 indicated by dashed line 18c. More preferably, furniture joints will typically use between 0.015 and 0.02 inches of twist in the tabs 18. Typically, second order bending of a panel will require less deflection than first order bending.

Figure 12:
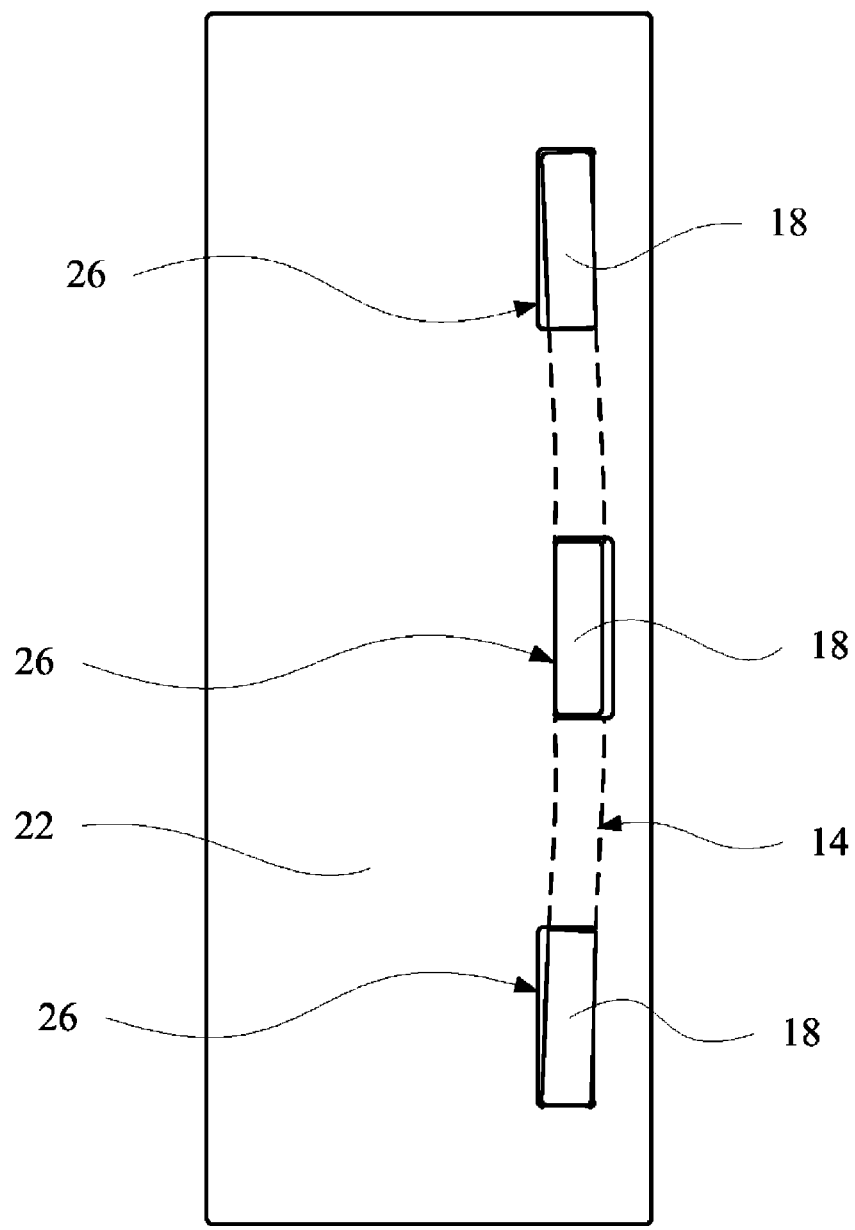
FIG. 12 shows an end view of a furniture joint of the present invention.

FIG. 12 shows a similar joint where panel 14 includes three tabs 18 and panel 22 includes three slots 26. The slots 26 need not be rotated, but the center slot is displaced laterally from a common line relative to the end slots, causing the panel 14 to be bent to tighten the joint 10.

Figures 13, 14:
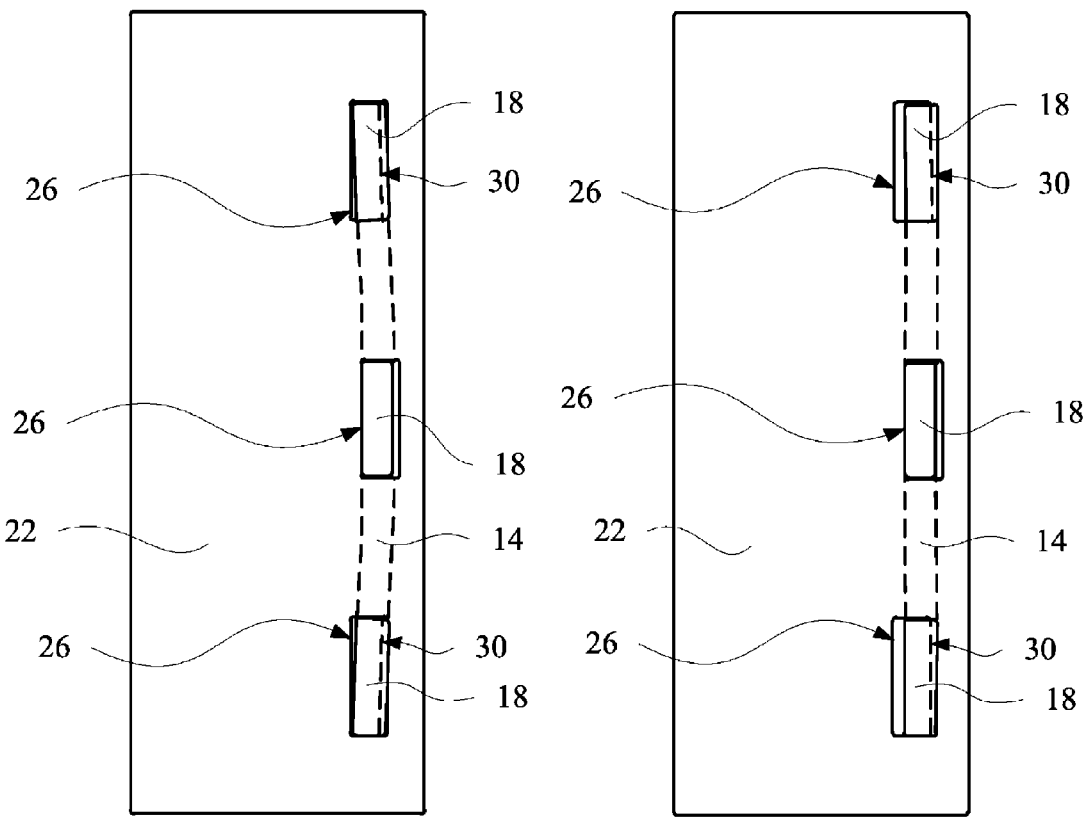
FIG. 13 shows an end view of a furniture joint of the present invention.
FIG. 14 shows an end view of a furniture joint of the present invention.

FIGS. 13 and 14 show a similar joint 10 where panel 14 has three tabs 18 and panel 22 has three slots 26. As discussed relative to FIG. 12, the center slot 26 is displaced laterally relative to a line between the end slots 26. Differing from FIG. 12, the end tabs 18 have a recess 30 formed as discussed above. The panel 14 is bent as shown in FIG. 13 to insert the tabs 18 into the slots 26. When the tabs 18 are pushed through the slots 26 sufficiently, the recesses 30 allow the panel 14 to unbend and sit in a neutral position. Panel 14 is thus held captive by the tabs 18 and slots 26 but is not stressed.

Figure 15:
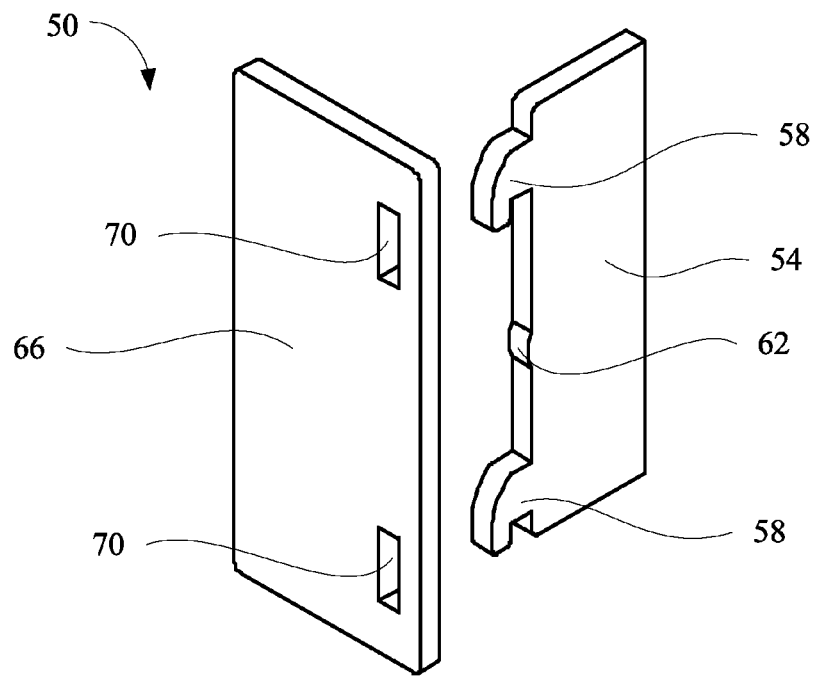
FIG. 15 shows a perspective view of a furniture joint of the present invention.
Figure 16:
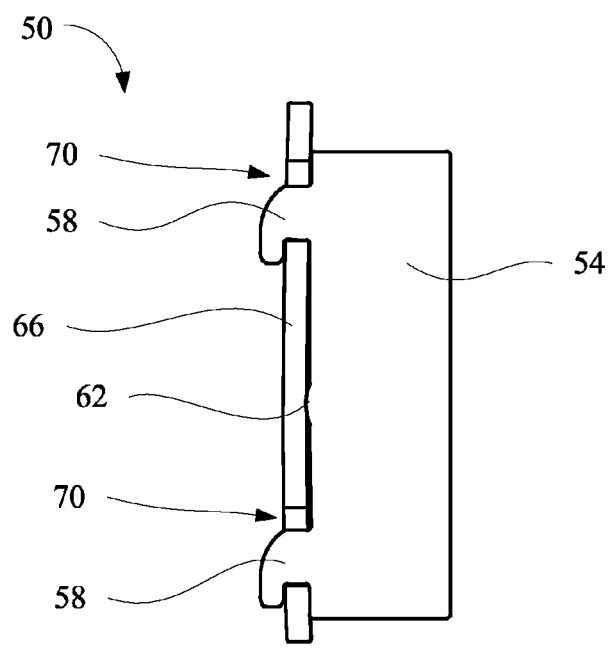
FIG. 16 shows an end view of the joint of FIG. 15.

FIGS. 15 and 16 show a hook joint 50 of the present invention. The joint includes a first panel 54 which has hooks 58 and a projection or nub 62 extending from an edge of the panel. A second panel 66 has slots 70 formed therein. As shown in FIG. 16, the hooks 58 pass through the slots 70 transversely and are then slid in a longitudinal direction to engage the panel 66. The nub 62 causes the panel 66 to bend (preferably between 0.005 and 0.05 inches) to place the joint under stress and cause increased tightness and friction. The joint is thus stabilized.

Figure 17:
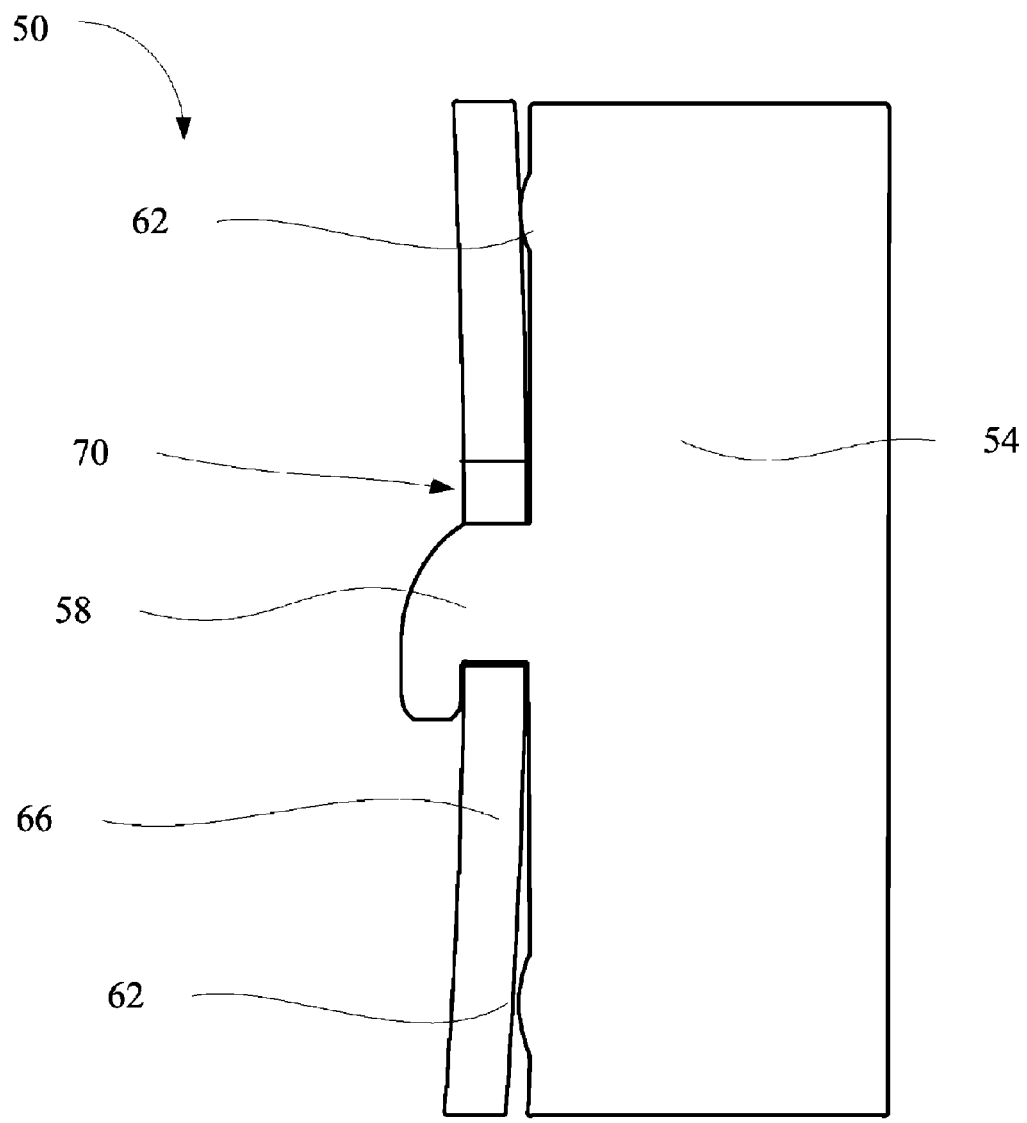
FIG. 17 shows an end view of a furniture joint of the present invention.
Figure 18:
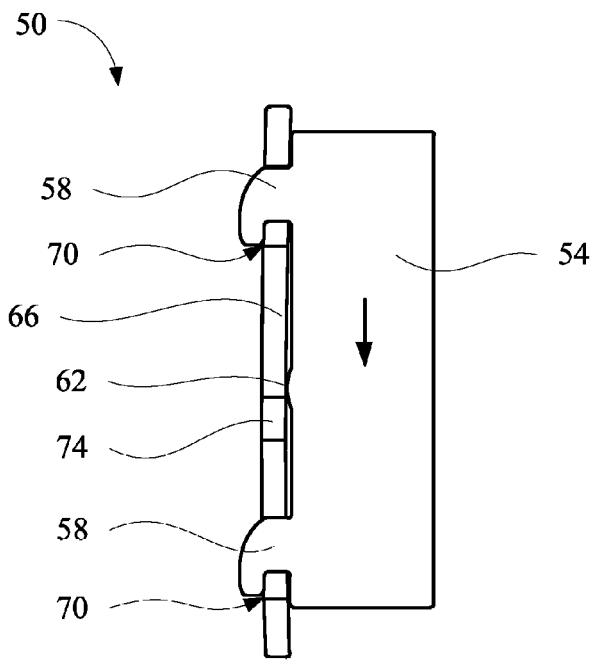
FIG. 18 shows an end view of a furniture joint of the present invention.
Figure 19:
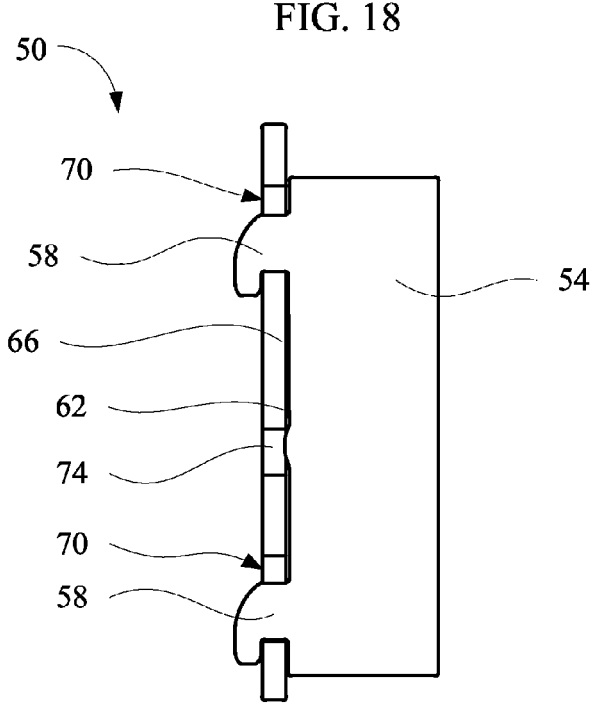
FIG. 19 shows an end view of the joint of FIG. 18.

FIG. 17 shows a similar joint 50 where a single hook 58 and two nubs 62 are used to bend the panel 66. FIGS. 18 and 19 show a joint 50 similar to the joint shown in FIGS. 15 and 16, but where panel 66 has an additional slot or recess 74 which receives nub 62 when the joint is in the assembled position shown in FIG. 19. This causes panel 66 to bend during insertion of the hooks (as shown in FIG. 18) and to unbend in the assembled position. The joint 50 is thus held together because panel 66 must bend to allow disassembly.

Figure 20:
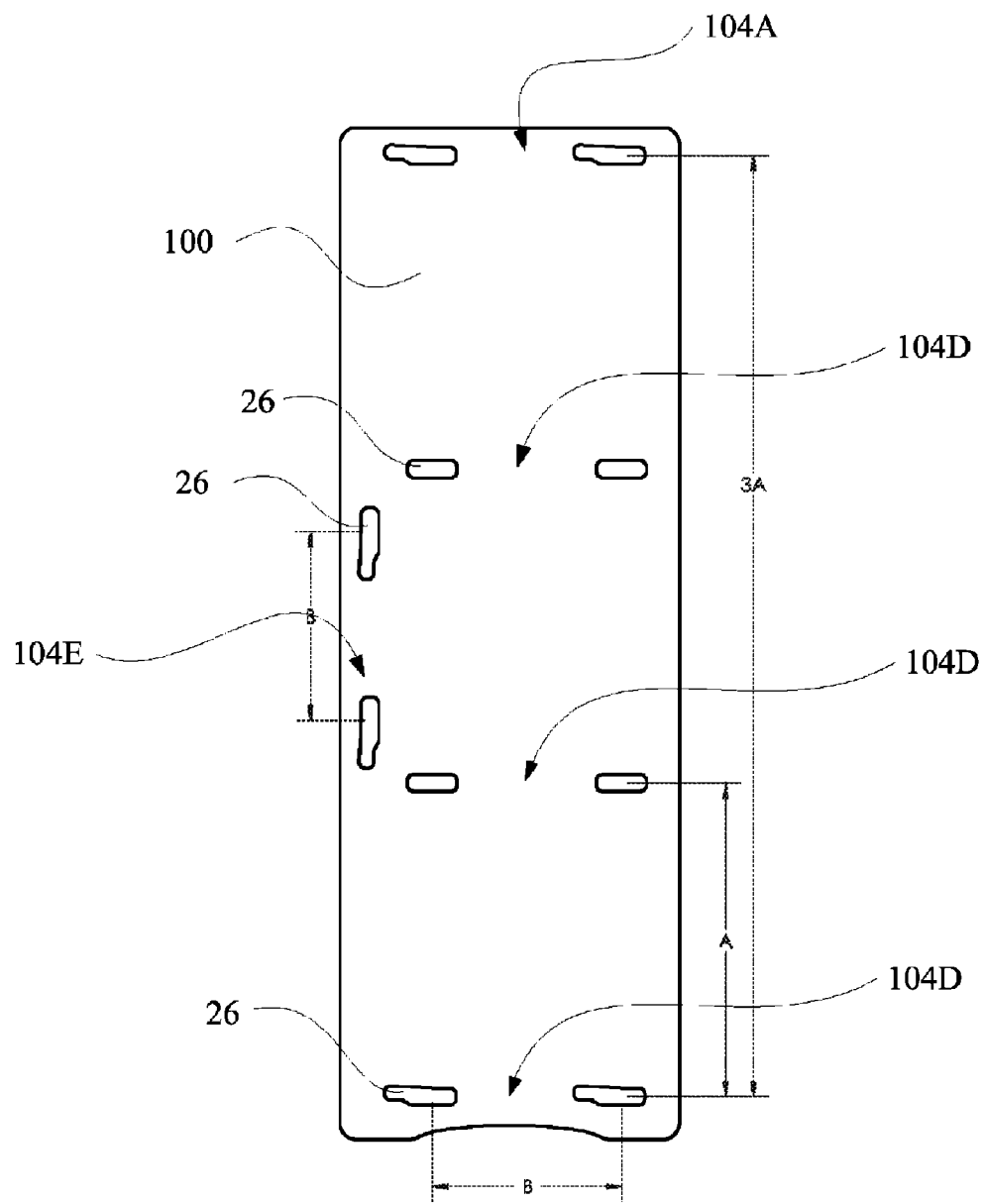
FIG. 20 shows a furniture panel of the present invention.

FIGS. 20 through 22 show different furniture components. It will be appreciated that, while not easily visible, the slots 26 or 70 are rotated or offset as discussed above to create tighter and more stable joints. Where multiple similar structures such as a plurality of slots are present, not all are labeled for clarity in viewing the drawing. FIG. 20 shows a panel 100 which is cut to form the side of a shelf. The shelf side panel 100 includes a plurality of slots 26. The shelf is built with two panels 100 and individual rectangular shelf or back panels extending between pairs of slots 104A through 104E. The shelf or back panels are similar to those shown in FIGS. 24 and 25.

Figure 24:
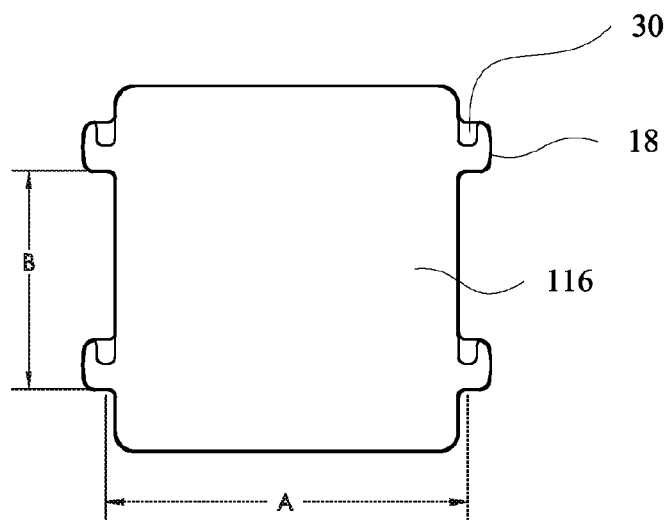
FIG. 24 shows a furniture panel of the present invention.
Figure 25:
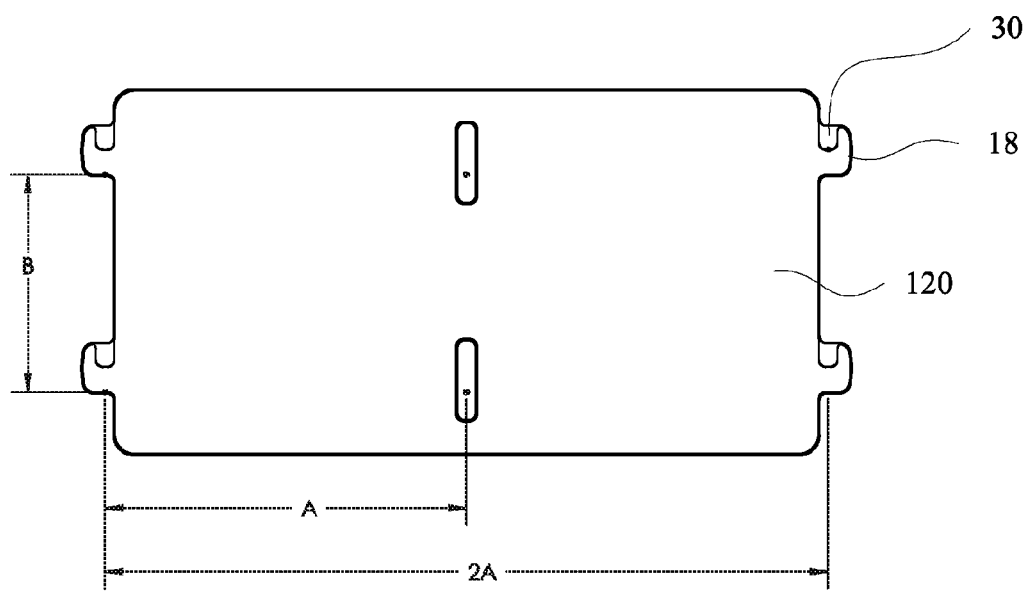
FIG. 25 shows a furniture panel of the present invention.

FIGS. 21 through 23 show side panels 108 for a chair or rocking chair. These side panels 108 include pairs 112A through 112C of slots 26. Two of the chair side panels 108 are used with three of the panels of FIGS. 24 and 25 to create a chair. FIG. 24 shows a short panel 116 which is placed between the chair side 108 or shelf side 100 to create the shelf. FIG. 25 shows a similar panel 120 which is longer. The panels 116, 120 have tabs 18 formed with recesses 30. As discussed above, the recesses 30 interlock with narrower portions of the slots 26 and keep the panels 116, 120 from pulling out of the slots 26 transversely when assembled.

Figure 26:
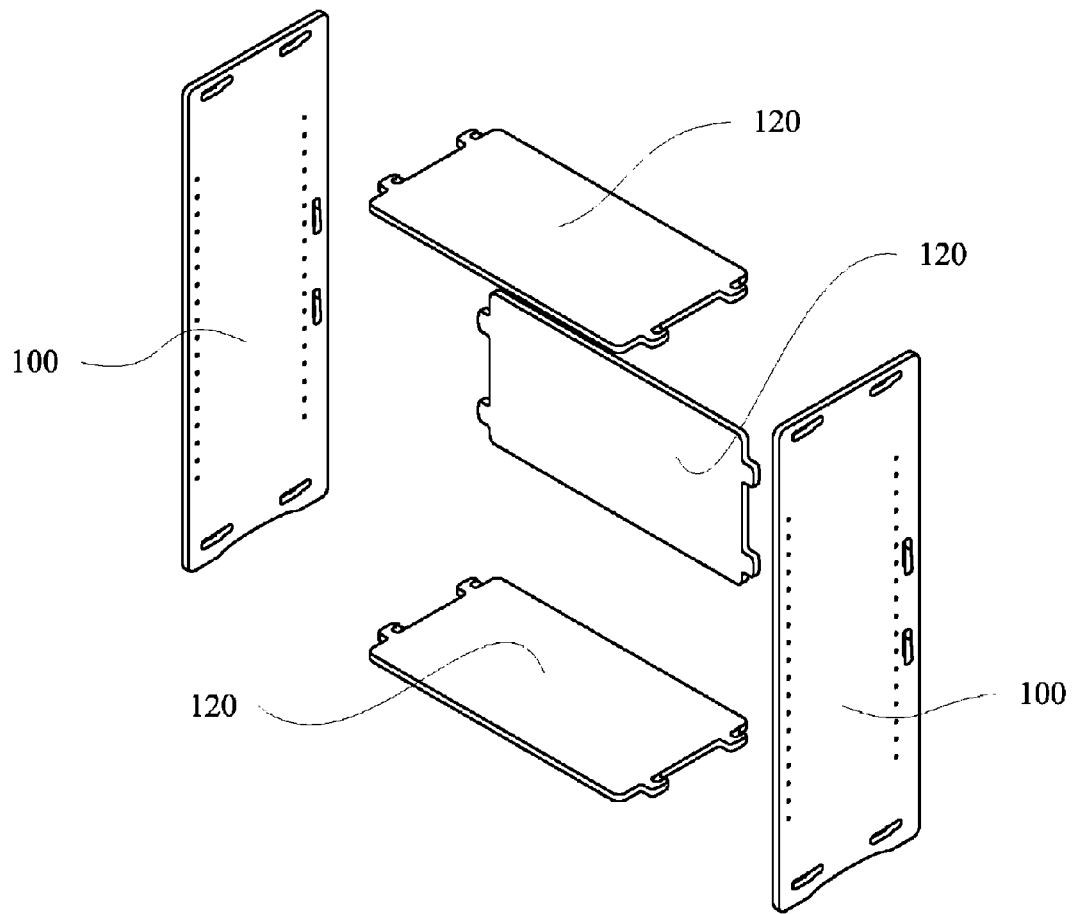
FIG. 26 shows a furniture assembly of the present invention.
Figure 27:
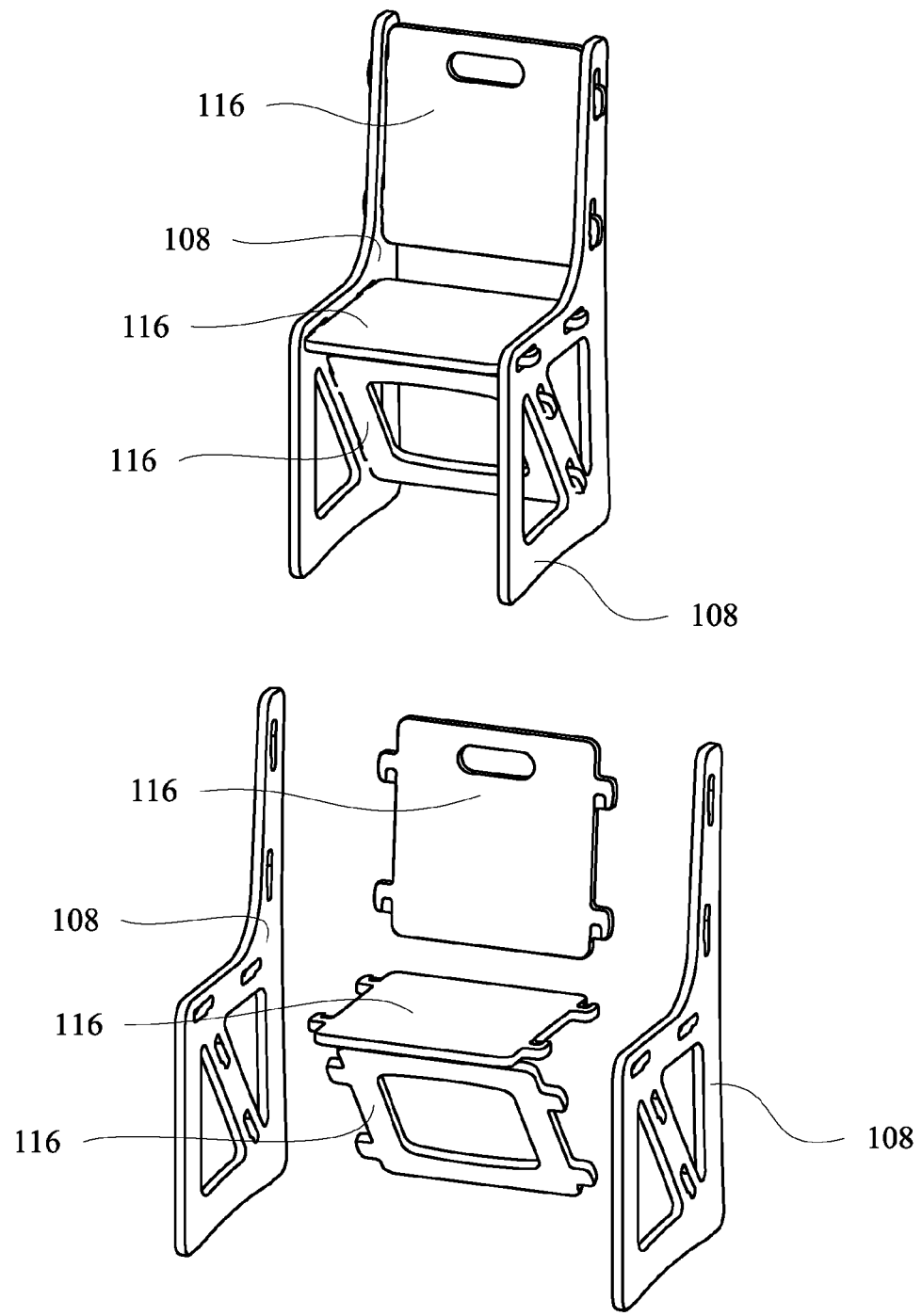
FIG. 27 shows a furniture assembly of the present invention.

FIG. 26 shows a shelf assembled from two side pieces 100 and three long shelf and back panels 120. FIG. 27 shows an assembled and unassembled view of a chair assembled with two side panels 108 and three short connecting panels 116. In these pieces of furniture, panels 116 and 120 are bent as discussed above to place the joints under some tension and stiffen the joints. There are several advantages to the furniture as shown. There is no hardware to complicate assembly or to lose. The furniture is assembled by simply placing the tabs 18 into the respective slots 26 and then sliding the tabs 18 to engage the narrowed portion 34 of the slots to lock the joints together. The ease of assembly allows children to assemble their own furniture.

The panels 116 and 120 are interchangeable within the piece of furniture as they can be made with the same length and the same number and spacing of tabs. The different panels 116, 120 can be made with different decorative cutout patterns (as visible in the chair) and can also be made in different colors. This allows the user to customize the furniture by selecting placement of each panel 116, 120.

Figure 28:
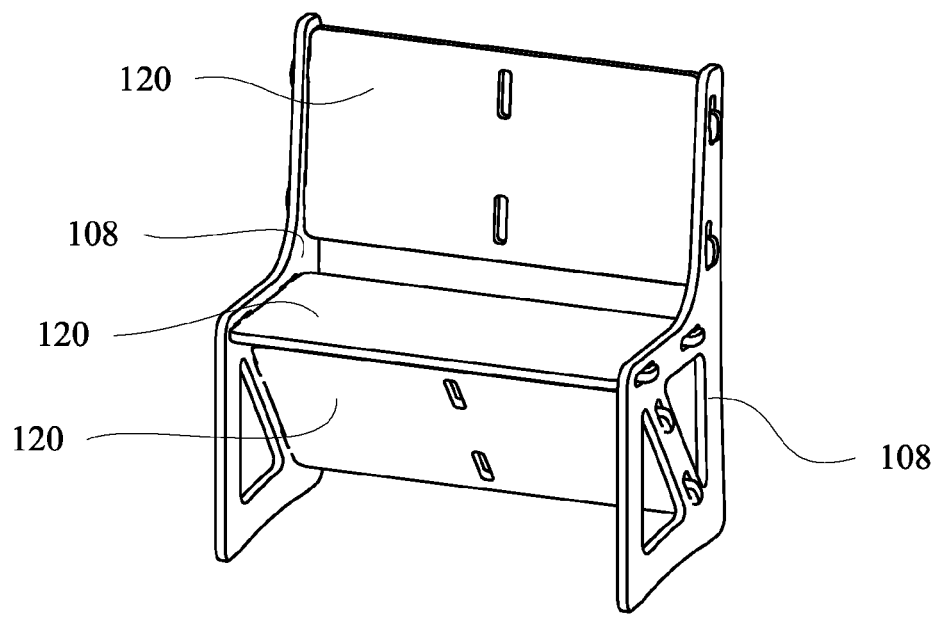
FIG. 28 shows a furniture assembly of the present invention.
Figure 29:
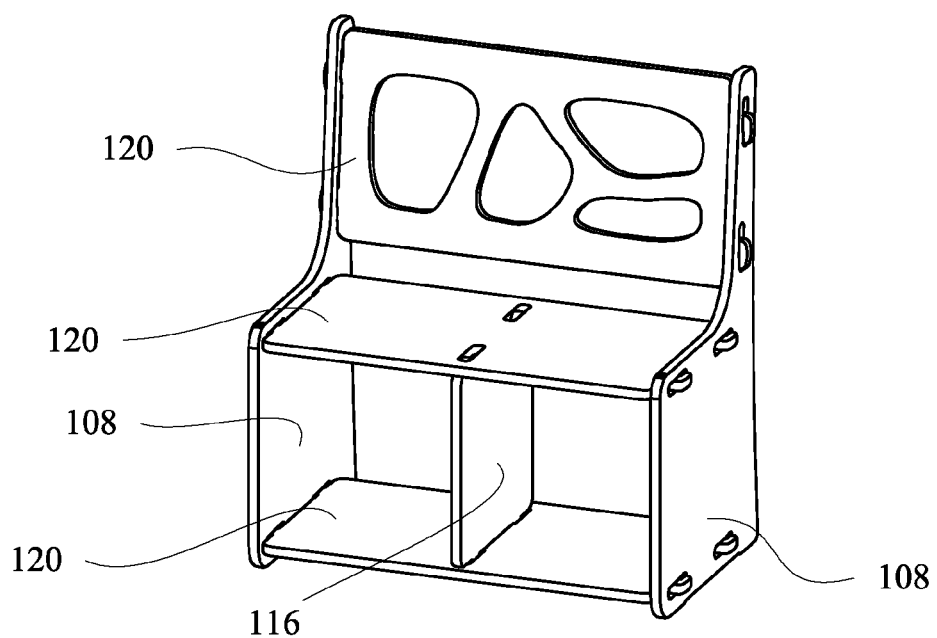
FIG. 29 shows a furniture assembly of the present invention.

Additionally, the furniture is customizable by exchanging pieces between different items of furniture. Instead of the shelf and chair shown above, a person can assemble the pieces to create a bench as shown in FIG. 28. The bench includes two chair sides 108 and three long connecting panels 120. As shown in FIG. 29, a bench with storage cubby can be made with two chair sides 108, three long connecting panels 120 and one short connecting panel 116. Similarly, the shelf sides 100 can be assembled with short connecting panels 116 to create a narrower shelf. The furniture can thus be customized by exchanging pieces to create many different furniture combinations.

Figure 30:
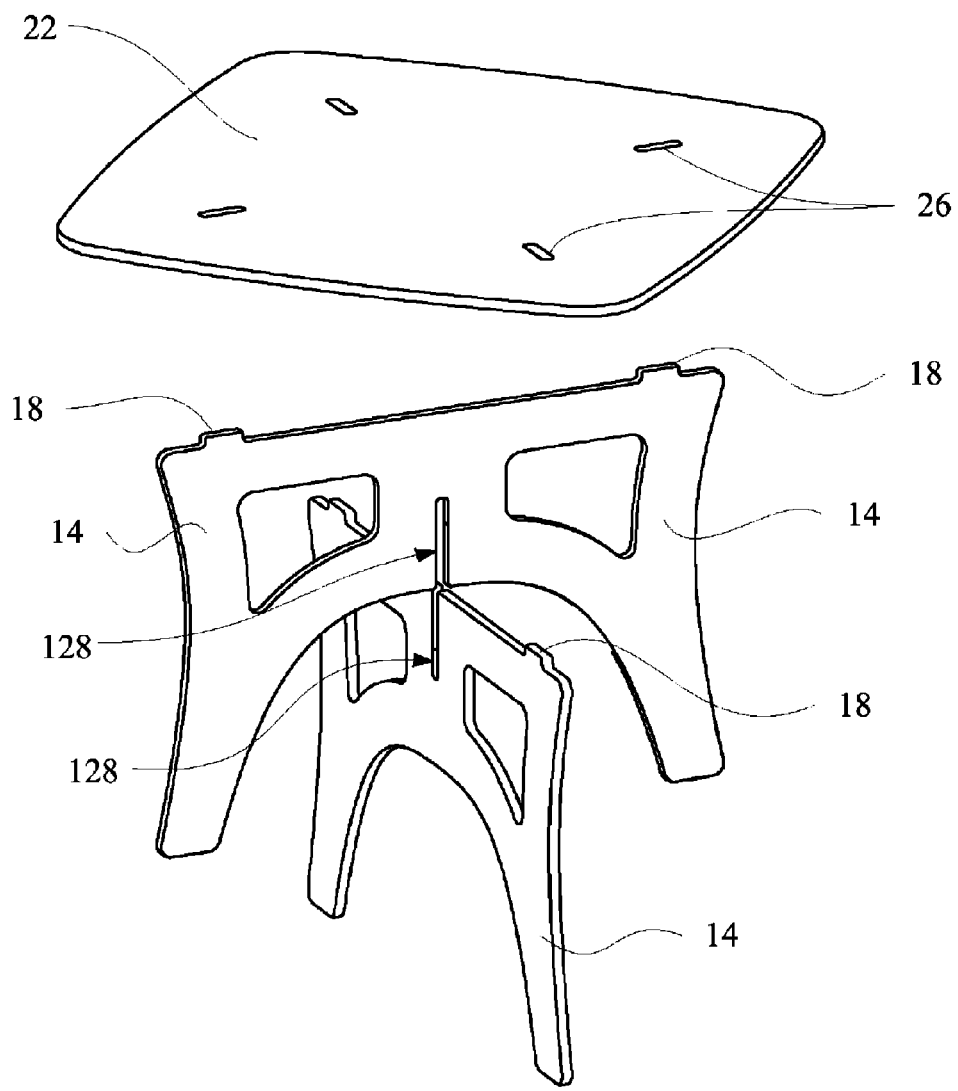
FIG. 30 shows a table of the present invention.

FIG. 30 shows a design for a stool or table 124 according to the present invention. The table 124 is formed with two panels 14 having tabs 18 and a top panel 22 with slots 26. The two panels 14 nest within each other with corresponding slots 128. The tabs 18 fit in the slots 26 as described above, twisting the panels 14 to stiffen the joints.

Figure 31:
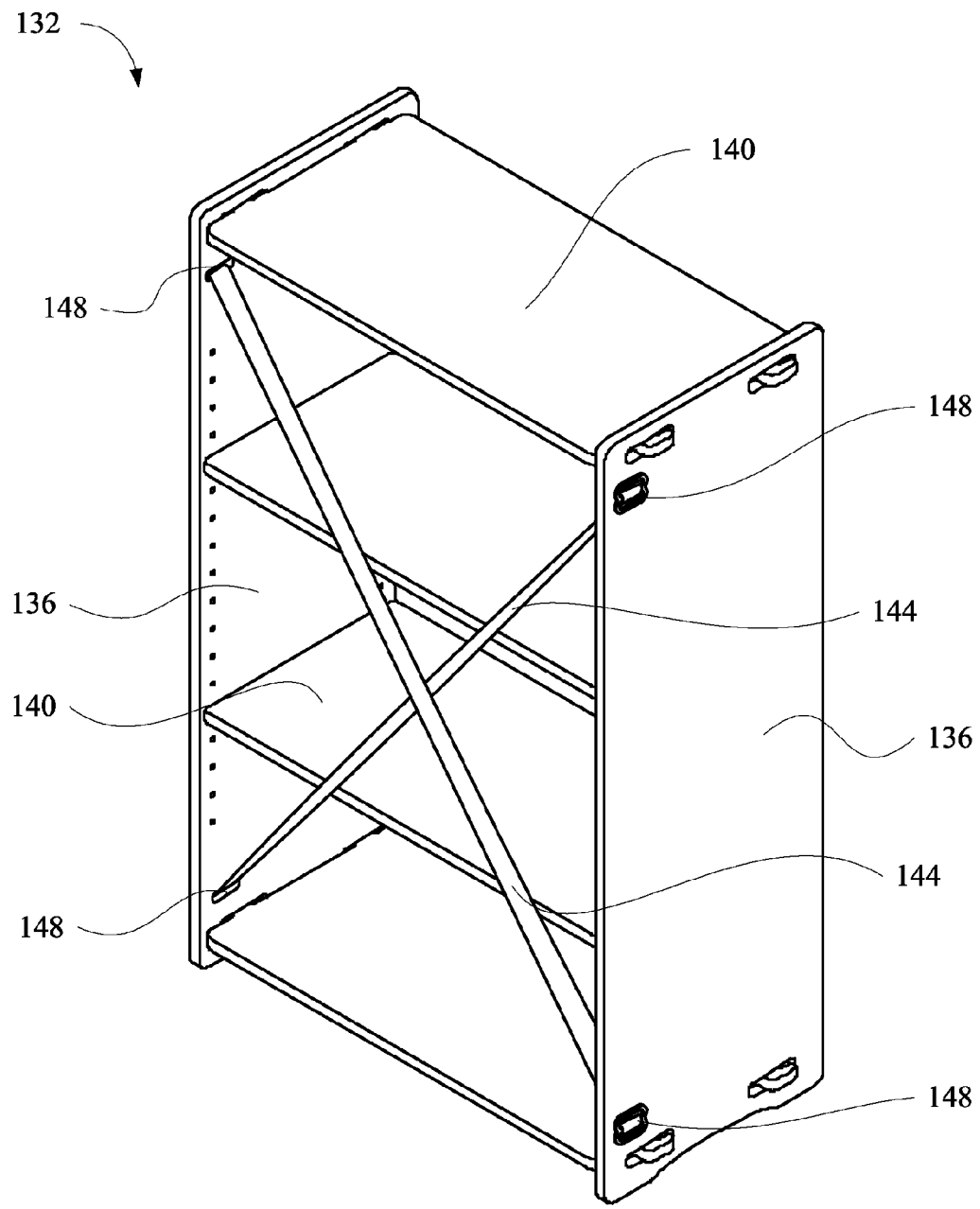
FIG. 31 shows a shelf with stabilizing straps according to the present invention.
Figure 32:
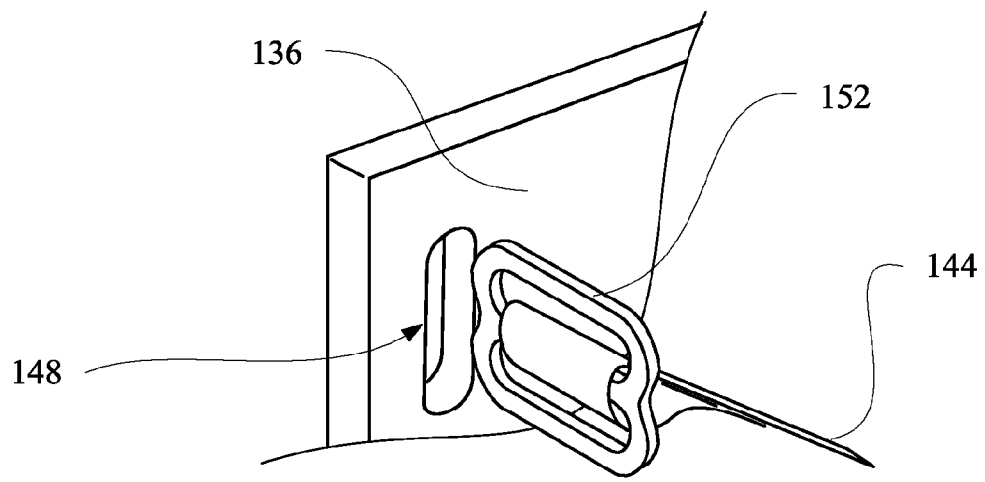
FIGS. 32 and 33 show the stabilizing straps of FIG. 31.
Figure 33:
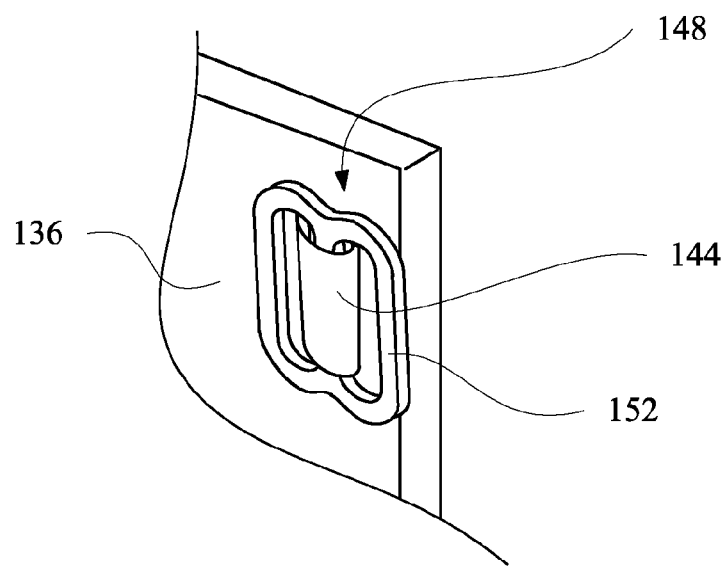

FIG. 31 shows a shelf 132 which is constructed using side panels 136 and lateral panels 140 which have tabs and slots as discussed above. The shelf 132 uses straps 144 to brace the piece of furniture. The side panels 136 (or alternatively the lateral panels 140) have strap slots 148 formed therein. FIGS. 32 and 33 show detail views of the strap ends and slots. The ends of the straps 144 have end plates 152 attached thereto. The end plates 152, when turned sideways, can fit through the strap slots 148. After passing through the slot 148, the end plate 152 is turned perpendicular to the strap 144 and secures the strap to the panel 136. The straps thus provide diagonal bracing to the piece of furniture.

There are also strength and manufacturing advantages to the present invention. The joints are stronger and do not wobble like many ready to assemble furniture joints. Because a range in the amount of twist or offset in the slots 26 will create a working joint, a middle value for slot twist or offset can be selected to account for variation in material thickness. This allows the joints to function well even with the normal variation in the thickness of plastics or woods. Moreover, where a tab 18 is formed which uses a recess 30 or a partial recess 30, cutting the recess into the tab forms the recess with a uniform thickness of remaining material and eliminates thickness variation in the material where the recess 30 engages the narrowed portion 34 of the slot 26, making the joints more consistent.

There is thus disclosed an improved modular or knock down furniture system with locking joints. It will be appreciated that numerous changes may be made to the present invention without departing from the scope of the claims.

What is claimed is:

1. A modular furniture system comprising:
a piece of furniture having a joint comprising:
a first bendable panel
two tabs extending from an edge of the first panel;
a second panel;
two slots formed in the second panel;
wherein the tabs are inserted into the slots to assemble the joint and wherein the slots of the second panel are arranged so that the first panel is maintained in a bent configuration after the tabs of the first panel are inserted into the slots of the second panel.

2. A modular furniture system comprising:
a piece of furniture having a joint comprising:
a first panel, the first panel having at least one tab;
a second bendable panel;
at least one slot formed in the second panel;
wherein the at least one tab is inserted into the at least one slot and extends around the second panel, wherein the first panel has a projection extending outwardly from an edge of the panel, and wherein the second panel is maintained in a bent configuration by the at least one tab and projection.

3. The system of claim 1, wherein the slots are disposed in misalignment with the tabs such that the tabs are twisted after they are fully inserted into the slots.

4. The system of claim 3, wherein at least one of the slots is disposed at an angle relative to a line drawn between centers of the slots.

5. The system of claim 3, wherein at least one of the tabs is twisted relative to a line drawn between centers of the tabs.

6. The system of claim 3, wherein there are three tabs and three slots and wherein one of the slots is offset from a line drawn between centers of the other two slots.

7. The system of claim 3, wherein a tab has a recess formed in a side thereof to create a section of the tab which is thinner than a surrounding section of the tab, wherein a corresponding slot has a wider section and a narrowed section extending therefrom, and wherein the tab is passed through the wider section of the slot transversely and then slid longitudinally into engagement with the narrowed section such that the recess engages the narrowed section.

8. The system of claim 7, wherein the recess does not extend to a distal end of the tab.

9. The system of claim 3, wherein the first panel and second panel are generally flat before assembly.

10. A modular furniture system comprising:
a piece of furniture having a joint, the joint comprising:
a first furniture member having a first slot and a second slot formed therein;
a second bendable planar furniture member having a first tab and a second tab formed therein;
wherein the first tab and second tab are inserted into the first and second slots respectively, and wherein the first slot and the second slot are arranged such that insertion of the first and second tabs bends the second furniture member to place the joint under stress, and wherein the second bendable furniture member remains bent when the first and second tabs are inserted into the first and second slots.

11. The system of claim 10, wherein the first slot comprises a wider portion and a narrower portion extending from the wider portion along the length of the slot, and wherein the tab may be inserted into the wider portion without bending the second furniture member, and wherein sliding the tab into engagement with the narrower portion twists the tab out of a plane of the second furniture member and bends the second furniture member.

12. The system of claim 11, wherein the first tab has a recess formed in face thereof such that the tab is a smaller adjacent the panel and a larger away from the panel, and wherein the recess engages the narrower portion of the slot to prevent the tab from being extracted transversely from the slot.

13. The system of claim 10, wherein at least one of the first and second slots is disposed at an angle relative to a line drawn between centers of the slots.

14. The system of claim 10, wherein at least one of the first and second tabs is twisted relative to a line drawn between centers of the tabs.

15. The system of claim 10, wherein the second furniture member is elastically bent out of plane when the furniture is assembled.

16. A modular furniture system comprising:
a plurality of rigid planer furniture members adapted to be assembled to form piece of furniture; and
a strap disposed diagonally between said furniture members to stabilize the piece of furniture,
wherein a furniture member has a strap slot formed therein and wherein the strap has a plate disposed at an end thereof, the plate being rotatable parallel to the strap to pass through the strap slot and then rotatable perpendicular to the strap slot to secure the strap into the slot.

17. The system of claim 16, wherein a first furniture member has two tabs formed on an end thereof, wherein a second furniture member has two slots formed therein, wherein the tabs are inserted into the slots, and wherein the tabs are twisted by the slots to hold the first furniture member in a bent position when fully assembled with the second furniture member.

* * * * *